United States Patent [19]

Hamada et al.

[11] Patent Number: 4,500,501

[45] Date of Patent: Feb. 19, 1985

[54] METHOD OF REMOVING SULFUR OXIDES AND NITROGEN OXIDES BY DRY PROCESS

[75] Inventors: Takeshi Hamada, Ichikawa; Yoshinobu Komatsubara, Kitakyushu, both of Japan

[73] Assignee: Mitsui Mining Company Ltd., Tokyo, Japan

[21] Appl. No.: 564,462

[22] Filed: Dec. 22, 1983

Related U.S. Application Data

[63] Continuation of Ser. No. 412,974, Aug. 27, 1982, abandoned.

[30] Foreign Application Priority Data

Sep. 10, 1981 [JP] Japan .................................. 56-141701

[51] Int. Cl.$^3$ ........................ B01J 8/00; C01B 21/00; C01B 17/00
[52] U.S. Cl. ................................... 423/239; 423/235; 423/244
[58] Field of Search .................. 423/235, 235 D, 239, 423/239 A, 244 R, 244 A, 545

[56] References Cited

U.S. PATENT DOCUMENTS

| | | | |
|---|---|---|---|
| 2,780,310 | 2/1957 | Schaub | 423/244 |
| 2,992,065 | 7/1961 | Feustel et al. | 423/244 |
| 3,913,253 | 10/1975 | Juntgen et al. | 423/244 |
| 3,961,020 | 6/1976 | Seki | 423/239 A |
| 4,272,497 | 6/1981 | Takahashi et al. | 423/239 A |
| 4,400,363 | 8/1983 | Grochowski et al. | 423/244 |

*Primary Examiner*—Gregory A. Heller
*Attorney, Agent, or Firm*—Wenderoth, Lind & Ponack

[57] ABSTRACT

This invention relates to a method of removing sulfur and nitrogen oxides by a dry process comprising passing a waste gas through a moving bed formed of a carbonaceous adsorbent in a direction transverse thereto to remove the sulfur oxides and adding ammonia to remove the nitrogen oxides, characterized in that in a system comprising n moving beds (n being an integer of at least 2), the waste gas is passed transversely through the first moving bed, mixed with ammonia outside the first moving bed, and then fed to the second moving bed, the similar procedure being repeated in order, and finally, the waste gas is passed transversely through the n-th moving bed, while the carbonaceous adsorbent is transported from the n-th moving bed to the first moving bed in order.

14 Claims, 5 Drawing Figures

METHOD OF REMOVING SULFUR OXIDES AND NITROGEN OXIDES BY DRY PROCESS

This application is a continuation of Ser. No. 412,974 filed Aug. 27, 1982 now abandoned.

BACKGROUND OF THE INVENTION

1. Field of the Invention

This invention relates to a method of removing sulfur and nitrogen oxides in a waste gas and more particularly, it is concerned with an improved method of removing sulfur and nitrogen oxides contained in a combustion waste gas from a boiler, etc. by adding ammonia to the waste gas and passing the thus-mixed gases through a moving bed formed of a carbon-containing adsorbent in a transverse direction at a temperature of from room temperature to 180° C.

2. Description of the Prior Art

A method has been known comprising adding ammonia to a waste gas containing sulfur oxides, nitrogen oxides, steam and oxygen, passing the waste gas through a single moving bed of a carbon-containing adsorbent and thus removing simultaneously the sulfur and nitrogen oxides at a relatively low temperature (e.g. room temperature to 180° C.) by the adsorption and catalytic action of the carbon-containing adsorbent. In this method, sulfur compounds are separated as sulfuric acid, ammonium sulfate or ammonium hydrogensulfate and nitrogen compounds are separated as nitrogen, ammonium nitrate or ammonium nitrate by the catalytic action of the carbon-containing adsorbent. In the temperature range of from room temperature to 180° C., however, the reaction of ammonia and sulfur oxides precedes that of ammonia and nitrogen oxides, so the prior art method wherein these reactions are simultaneously carried out in a single moving bed has the disadvantage that the removal efficiency of nitrogen oxides is not increased and the consumption of ammonia is markedly increased. Thus, it is considered to raise the temperature of a waste gas at the sacrifice of boiler efficiency or to raise the temperature before feeding to the reaction bed by the use of a new heat source, but this is not favourable economically because of the need to raise the temperature by about 50° C.

In another known system as shown in FIG. 1, two moving beds 4 and 5 are arranged in parallel and carbon-containing adsorbent 2 is separately fed to first moving bed 4 and second moving bed 5, while waste gas 1 is passed through first moving bed 4 and then through second moving bed 5 in a transverse direction thereto. In the first moving bed, the most part of sulfur oxides is removed by the adsorption action of the carbon-containing adsorbent and in the second moving bed, nitrogen oxides are separated as nitrogen, ammonium nitrate or ammonium nitrite by reaction with ammonia 3 added before the second moving bed and by the catalytic action of the carbon-containing adsorbent. During the same time, the adsorbent whose activity is lowered is regenerated in regenerator 6 and if necessary, ammonia 3' can be added to the waste gas before first moving bed 4. This is apparently a reasonable process, but the quantity of the carbon-containing adsorbent to be moved for regeneration is markedly large, since the carbon-containing adsorbent is separately introduced into two moving beds arranged in parallel and regeneration of the carbon-containing adsorbent whose activity is lowered due to the deposition of ammonium nitrate or ammonium nitrite in the second moving bed is required in addition to that of the first moving bed.

In an apparatus for removing sulfur and nitrogen oxides by a dry process using carbon-containing adsorbents, the proportion of the cost of carbon-containing adsorbent is large compared to the operation cost of the apparatus and accordingly, it may safely be said that the former is the key factor in this dry process system. Furthermore, the regeneration of carbonaceous adsorbents is generally carried by heating using fuels such as COG, fuel oils and the like and the fuel cost is not negligible. Therefore, the above described method cannot avoid the drawback that a larger quantity of carbon-containing adsorbent is moved and regenerated, thus resulting in increase of the quantity of carbon-containing adsorbent consumed or lost and the quantity of a fuel consumed and thus raising remarkably the operation cost.

SUMMARY OF THE INVENTION

It is an object of the present invention to provide a method of removing sulfur and nitrogen oxides by a dry process whereby the above described disadvantages of the prior art can be overcome.

It is another object of the present invention to provide a method of removing sulfur oxides and nitrogen oxides by contacting a waste gas transversely with the flow of a carbonaceous adsorbent.

It is a further object of the present invention to provide a method of removing sulfur and nitrogen oxides by a dry process with a decreased quantity of carbonaceous adsorbent moved and regenerated without lowering the removal efficiency of $SO_x$ and $NO_x$.

These objects can be attained by a method of removing sulfur and nitrogen oxides by dry process comprising passing a waste gas through a moving bed formed of a carbonaceous adsorbent in a direction transverse thereto to remove the sulfur oxides and adding ammonia to remove the nitrogen oxides, characterized in that in a system comprising n moving beds (n being an integer of at least 2), the waste gas is passed transversely through the first moving bed, mixed with ammonia outside the first moving bed, and then fed to the second moving bed, the similar procedure being repeated in order, and finally, the waste gas is passed tranversely through the n-th moving bed, while the carbonaceous adsorbent is transported from the n-th moving bed to the first moving bed in order.

BRIEF DESCRIPTION OF THE DRAWINGS

The accompanying drawings are to illustrate the principle and merits of the present invention in detail.

DETAILED DESCRIPTION OF THE INVENTION

The inventors have made efforts to develop an improved method for removing sulfur and nitrogen oxides by dry process whereby the above described disadvantages of the prior art can be overcome and consequently, have found that a method is very effective comprising transporting moving beds formed of a carbonaceous adsorbent in series and in order, passing a waste gas through the moving bed in a direction transverse thereto, adding ammonia to the waste gas leaving the moving bed and passing the waste gas again through the moving bed in a direction transverse thereto; this basic flow of the waste gas being repeated in the reverse direction to that of the moving bed.

That is to say, the present invention provides a method of removing sulfur and nitrogen oxides by a dry process comprising passing a waste gas through a moving bed formed of a carbonaceous adsorbent in a direction transverse thereto to remove the sulfur oxides and adding ammonia to remove the nitrogen oxides, characterized in that a system comprising n moving beds (n being an integer of 2 or more), the waste gas is passed transversely through the first moving bed, mixed with ammonia outside the first moving bed, and then fed to the second moving bed, the similar procedure being repeated in order and finally, the waste gas is passed transversely through the n-th moving bed, while the carbonaceous adsorbent is transported from the n-th moving bed to the first moving bed in order. As occasion demands, ammonia can be added to the waste gas before the first moving bed.

Useful examples of the carbonaceous adsorbent are activated carbons, activated cokes, semi-cokes and the like which are commonly used, and the ammonia is used in the form of ammonia gas alone or diluted with another suitable gas. The n moving beds formed of a carbonaceous adsorbent can be provided separately in n vessels or in one vessel by suitably partitioning it. The each moving bed is ordinarily held at a temperature of from room temperature to 180° C.

The present invention will now be illustrated in detail as to one embodiment using two moving beds.

Figure 1:
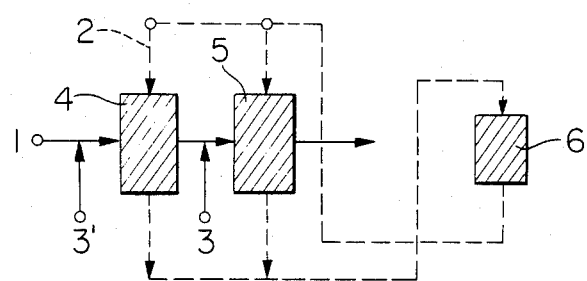
FIG. 1 is a schematic view of the prior art system for removing sulfur and nitrogen oxides by dry process.
Figure 2:
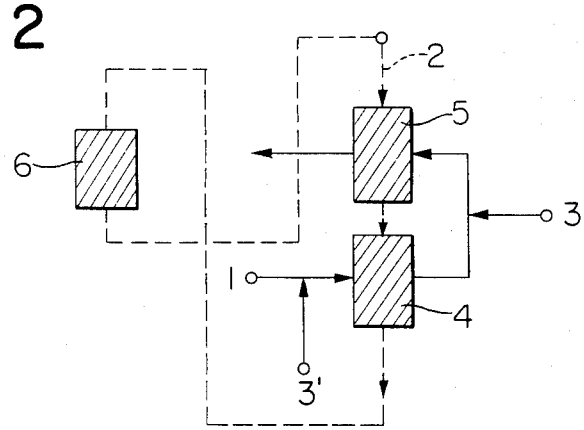
FIG. 2 is a schematic view of one embodiment of a system for removing sulfur and nitrogen oxides according to the present invention.

Referring to FIG. 2, waste gas 1 is mixed with ammonia 3′, passed through first moving bed 4 formed of a carbonaceous adsorbent 2 in a direction transverse thereto, mixed with ammonia 3 and then passed through second moving bed 5 in a direction transverse thereto. On the other hand, carbonaceous adsorbent 2 is passed through second moving bed 5 and then first moving bed 4 where removal of sulfur oxides and nitrogen oxides is respectively carried out, regenerated in regenerator 6 and then circulated again to second moving bed 5. In the case of using three or more moving beds, the similar procedure can be carried out. In any case, a waste gas and carbonaceous adsorbent are contacted so as to be crossed each other, but the waste gas outside the moving bed is allowed to flow in the reverse direction to the adsorbent.

A waste gas containing sulfur oxides and nitrogen oxides is fed to the first moving bed at a temperature ranging from rooom temperature to 180° C. as it is or after controlling the temperature. For example, a waste gas from a coal combustion boiler is at a temperature of 110°-150° C. after air preheater and contains several hundreds to several thousands ppm of $SO_2$, 100 to 600 ppm of $NO_x$, 3 to 15% of $O_2$ and 8 to 10% of $H_2O$.

In the first moving bed, the sulfur oxides are separated as sulfuric acid by the adsorption action of the carbonaceous adsorbent and when further adding ammonia, ammonium sulfate or ammonium hydrogensulfate is formed while simultaneously, the nitrogen oxides are separated as nitrogen, ammonium nitrate or ammonium nitrite by the catalytic action of the carbonaceous adsorbent. However, since the reaction of $NH_3$ and nitrogen oxides is considerably slower than that of $NH_3$ and sulfuric acid at a temperature of from room temperature to 180° C., a high removal efficiency of nitrogen oxides cannot be obtained if there remains $SO_2$ in the waste gas. When a waste gas containing 890 ppm of $SO_2$ and 155 ppm of $NO_x$ is passed through a moving bed consisting of a carbonaceous adsorbent at a temperature of 155° C., $NH_3$-adding ratio ($NH_3/SO_2$) of 0.47 mol/mol and SV of 500 $^{-1}$, for example, the concentrations of $SO_2$ and $NO_x$ in the waste gas at the outlet are respectively 120 ppm and 90 ppm, corresponding to a nitrogen oxide removal efficiency of 41.9%. When a waste gas containing 920 ppm of $SO_2$ and 297 ppm of $NO_x$ is passed through a moving bed consisting of a carbonaceous adsorbent at a temperature of 155° C., $NH_3$-adding ratio ($NH_3/SO_2$) of 0.32 mol/mol and SV of 500 $hr^{-1}$, the concentrations of $SO_2$ and $NO_x$ in the waste gas at the outlet are respectively 210 ppm and 220 ppm, corresponding to a nitrogen oxide removal efficiency of 25.9%. As described above, in a single moving bed where there remains 50 to 300 ppm of $SO_2$, a nitrogen oxide removal efficiency of about 10 to 50% is only obtained even if $NH_3$ is added in an $NH_3$-adding ratio ($NH_3/SO_2$) of 0.1 to 1.4 mol/mol.

The waste gas, from which the most part of sulfur oxides is separated in the first moving bed and when adding further ammonia in the first moving bed, 10 to 50% of nitrogen oxides is separated, is then fed to the second moving bed after $NH_3$ is added in an $NH_3$-adding ratio ($NH_3/SO_2+NO_x$) of 0.1 to 1.4. The temperature of the waste gas increases ordinarily by 0° to 15° C. due to the adsorption heat in the first moving bed. In the second moving bed, the nitrogen oxides are separated as nitrogen, ammonium nitrate or ammonium nitrite by the catalytic action of the carbonaceous adsorbent. When the waste gas is passed through the two moving beds as described above, a higher nitrogen oxide removing efficiency of 60 to 95% can be obtained.

After the carbonaceous adsorbent is passed through the second moving bed wherein removal of nitrogen oxides is mainly carried out, it is reused in the first moving bed wherein removal of sulfur oxides is mainly carried out. When a waste gas containing 210 ppm of $SO_2$ and 87 ppm of $NO_x$ is passed through a carbonaceous adsorbent at a temperature of 147° C. and SV of 500 $hu^{-1}$, for example, there are obtained an $SO_2$ removal efficiency of 98% and an $NO_x$ removal efficiency of 36.8% where the residence time of the carbonaceous adsorbent is 50 hr. When a waste gas containing 210 ppm of $SO_2$ and 105 ppm of $NO_x$ is passed through a carbonaceous adsorbent at a temperature of 147° C. and SV of 500 $hr^{-1}$, for example, there are obtained an $SO_2$ removal efficiency of 88% and an $NO_x$ removal efficiency of 21.4% where the residence time of the carbonaceous adsorbent is 100 hr. When the carbonaceous adsorbent used in the second moving bed is reused in the first moving bed, the quantity of the adsorbent to be moved, i.e. to be regenerated can be decreased without lowering the efficiency of removing sulfur and nitrogen oxides, while as a secondary effect, the $SO_2$ loading quantity of the carbonaceous adsorbent in the regenerator can be made uniform, thus resulting in decrease of the operation cost.

Figure 3:
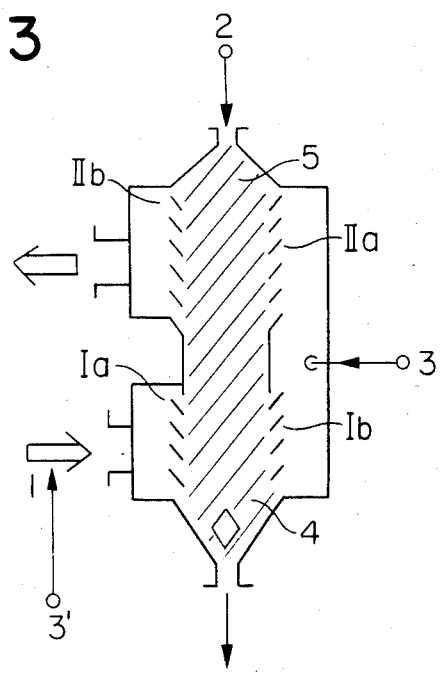
FIG. 3 is a schematic view of a moving bed suitable for practicing the method of the present invention.

One preferred embodiment of the present invention will be given. Referring to FIG. 3, the first moving bed 4 and second moving bed 5 are vertically arranged and carbonaceous adsorbent 2 is passed firstly through second moving bed 5 and then through first moving bed 4, followed by discharging. During the same time, the carbonaceous adsorbent 2 is vertically moved as a piston flow such that the adsorbent passing near louvre IIb of second moving bed 5 passes near louvre Ia of first moving bed 4, and the adsorbent passing near louvre IIa of second moving bed 5 passes near louvre Ib of first moving bed 4. On the other hand, waste gas 1 with or without addition of ammonia 3' is passed through first moving bed 4 so as to be crossed each other and leaving first moving bed 4, waste gas 1 with ammonia 3 is passed through second moving bed 5 to be crossed each other in the reverse direction to the flow of waste gas 1 in first moving bed 4, i.e. waste gas 1 being flowed from louvre Ia to louvre IIb via louvre Ib and louvre IIa.

Figure 4:
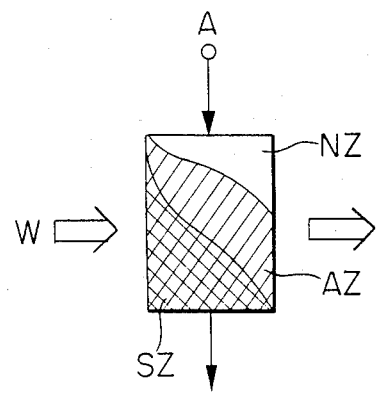
FIG. 4 is a partial and cross-sectional view of the moving bed to illustrate the principle of the present invention.

Adsorption of an ordinary carbonaceous adsorption reaches saturation with an $SO_2$ adsorption quantity of 10-80% by weight ($100\times$kg $SO_2$/kg adsorbent), but when a waste gas W is passed through a single moving bed in a transverse direction, distribution of the $SO_2$ adsorption quantity on the carbonaceous adsorbent A in the moving bed is as shown in FIG. 4, in which there is a considerable area of non-adsorbed zone NZ in addition to saturated zone SZ and adsorbed zone AZ. In order to reduce or minimize this non-adsorbed zone, it is required to allow a waste gas to flow in countercurrent with an adsorbent. However, this is nearly impossible in designing a useful adsorbing column on a commercial scale. Where an adsorbent bed is divided into at least two and arranged vertically in series and a waste gas is allowed to flow in the direction shown in FIG. 3 as in the above described embodiment of the present invention, the adsorbent with a less $SO_2$ adsorption quantity in second moving bed 5 flows downward to the waste gas inlet in first moving bed 4 and the adsorbent with a more $SO_2$ adsorption quantity in second moving bed 5 flows downward to the waste gas outlet side in first moving bed 4. Therefore, the distribution of $SO_2$ adsorption on the adsorbent is made uniform throughout the moving bed and the capacity of the adsorption zone is increased.

In this embodiment, an upper moving bed and a lower moving bed are provided in series and an adsorbent is moved from the upper bed to the lower bed in piston flow, while a waste gas is firstly passed through the lower bed and then passed through the upper bed in a transverse direction. Thus, the following effects or merits are obtained:

(a) The adsorbent is moved from the upper bed to the lower bed without mixing or stirring.

(b) The adsorbent granules are vertically moved without change of the relative portions, while a waste gas is transversely passed through the lower bed and then similarly passed through the upper bed but from the opposite side thereof. Consequently, the non-adsorbed zone of the adsorbent is remarkably reduced and the $SO_2$ load on the adsorbent is uniform.

(c) Removal of nitrogen oxides can be conducted with a higher efficiency since a waste gas is subjected to removal of $SO_2$ in the lower bed, mixed with ammonia and then brought into contact with the fresh adsorbent.

Figure 5:
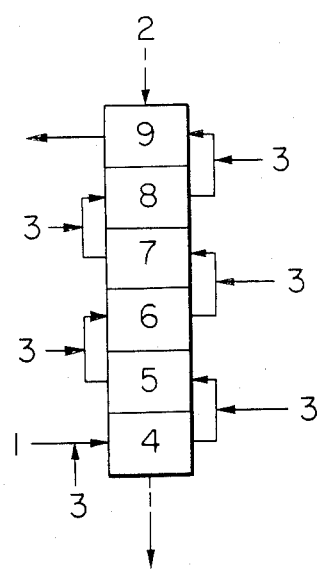
FIG. 5 is a schematic view of another embodiment of a system for removing sulfur and nitrogen oxides accroding to the present invention.

FIG. 5 shows a further embodiment of the present invention wherein 6 moving beds 4 to 9 formed of carbonaceous adsorbent 2 are provided in one column and waste gas 1 is passed through moving beds 4-9 in such a manner that waste gas is allowed to flow in the opposite direction to the flow of adsorbent, to flow in the opposite direction from each other in the adjacent beds and to pass through each moving bed in a transverse direction, and ammonia 3 is added to waste gas 1 when leaving each moving bed.

When a waste gas is mixed with ammonia and subjected to removal of sulfur and nitrogen oxides in a single bed of carbonaceous adsorbent, the reaction of the sulfur oxides with ammonia preceeds that of the nitrogen oxides with ammonia at a temperature ranging from room temperature to 180° C. For the purpose of raising the removal efficiency of nitrogen oxides, therefore, it is effective to divide the adsorbent bed into two moving beds and to add ammonia to the waste gas from which sulfur oxides are somewhat removed in the first moving bed. However, if a waste gas is allowed to flow from second moving bed 5 to first moving bed 4 in the apparatus shown in FIG. 3, for example, the waste gas to which ammonia is added on the way is passed through the adsorbent on which sulfur oxides are adsorbed in a large amount and the removal efficiency of nitrogen oxides is not so increased. According to the present invention, on the contrary, a waste gas from which sulfur oxides are somewhat removed is brought into contact with a fresh adsorbent after adding ammonia thereto, thus obtaining an effectively increased removal efficiency of nitrogen oxides.

In a further embodiment of the present invention, the waste gas leaving the final carbonaceous adsorbent bed can be treated by the carbonaceous adsorbent used mainly for removal of sulfur oxides to thus remove unreacted ammonia. Since a carbonaceous adsorbent holding sulfuric acid in an amount of 5-20% by weight as $SO_2$ is obtained in a step of removing sulfur oxides, a part or all of the adsorbent is used for removing unreacted ammonia in the waste gas from a step of removing nitrogen oxides. According to this embodiment, excessive ammonia can be added to the waste gas in the step of removing nitrogen oxides and even at low reaction temperatures, a higher $NO_x$ removal efficiency can be obtained.

In a still further embodiment of the present invention, ammonia is directly added to a moving bed so as to prevent a flue and perforated plate or louvre at the inlet of the moving bed from clogging due to formation, deposition and growth of ammonium salts.

If waste gases to be processed according to the present invention contain undesirable components such as chlorine, fluorine and other trace elements in addition to sulfur oxides and nitrogen oxides, these impurities can be removed similarly or simultaneously by the method of the present invention.

The present invention will be explained in detail with reference to the following examples. It will be obvious to those skill in the art that various changes and modifications can be made in the components, ratios, operational order and the like without departing from the spirit of the present invention. Therefore, the present invention should not be construed as being limited to the following examples.

EXAMPLE 1

A fuel oil combustion waste gas containing 960 ppm of $SO_2$ and 150 ppm of $NO_x$, to which NO had been added from an NO cylinder to give an $NO_x$ concentration of 300 ppm, was passed through moving beds of a carbon adsorbent (granular activated carbon) at a temperature of 155° C. and a flow rate of 970 $Nm^3/hr$. The moving beds were vertically arranged in series as shown in FIG. 2. The carbon adsorbent entered the top of the second moving bed and was moved from the second moving bed to the first moving bed continuously at a constant flow rate, e.g. 40 l/hr by a vibration feeder. The waste gas was transversely passed through the first moving bed and then through the second moving bed, followed by discharging in a chimney.

Ammonia was added to the waste gas at the upper course of the first moving bed with an ammonia-adding ratio ($NH_3/SO_2$) of 0.193 mol/mol and added to the waste gas at the upper course of the second moving bed with an ammonia-adding ratio ($NH_3/SO_2+NO_3$) of 0.87. The test results after 50 hours showed 135 ppm of $SO_2$ and 215 ppm of $NO_x$ at the lower course of the first moving bed and 3 ppm of $SO_2$ and 55 ppm of $NO_x$ at the lower course of the second moving bed.

COMPARATIVE EXAMPLE 1

The same waste gas and ammonia-adding ratio as those of Example 1 were used. Moving beds were arranged left and right in parallel and a carbon-containing adsorbent (granular activated carbon) was separately introduced into the first moving bed and second moving bed and discharged at a flow rate of 40 l/hr (total: 80 l/hr) by the use of a vibrating feeder. The test results after 50 hours showed 205 ppm of $SO_2$ and 220 ppm of $NO_x$ at the lower course of the first moving bed and 3 ppm of $SO_2$ and 56 ppm of $NO_x$ at the lower course of the second moving bed.

EXAMPLE 2

A fuel oil combustion waste gas containing 1000 ppm of $SO_2$ and 180 ppm of $NO_x$ was passed through moving beds of carbonaceous adsorbent (activated formed coke) arranged vertically in series as shown in FIG. 3 at a temperature of 120° C. and a flow rate of 1000 $Nm^3/hr$. The carbonaceous adsorbent was moved at a rate of 50 l/hr and ammonia was added to the waste gas before the first moving bed at a rate of 0.2 $Nm^3/hr$ and to the waste gas before the second moving bed at a rate of 0.16 $Nm^3/hr$.

The test results shows that the waste gas leaving the second moving bed contained 4 ppm of $SO_2$ and 35 ppm of $NO_x$.

COMPARATIVE EXAMPLE 2

The procedure of Example 2 was repeated except using the upper moving bed as a first moving bed and the lower moving bed as a second moving bed and passing the waste gas firstly through the upper moving bed and then through the lower moving bed. The test results showed that the waste gas leaving the second moving bed contained 4 ppm of $SO_2$ and 117 ppm of $NO_x$. The $NO_x$ removal efficiency was markedly lowered as compared with Example 2.

It will clearly be understood from the above described Examples and Comparative Examples that according to the present invention, at least the similar degree of removal efficiency of sulfur and nitrogen oxides can be obtained with a reduced quantity of carbonaceous adsorbent regenerated to half as much as the prior art method, and in particular, a higher removal efficiency of nitrogen oxides can be obtained.

What is claimed is:

1. In a method of removing sulfur and nitrogen oxides by a dry process comprising passing a waste gas containing sulfur and nitrogen oxides through a moving bed or beds formed of a carbonaceous adsorbent in a direction transverse thereto to remove the sulfur oxides and adding ammonia to remove the nitrogen oxides, the improvement which comprises passing the waste gas containing sulfur and nitrogen oxides through n number of moving beds each formed of carbonaceous materials moving downward in a piston flow in such a manner that the waste gas is allowed to flow upward, said waste gas being directed through each of the moving beds in a transverse direction and in an opposite direction to the movement of the waste gas in the next adjacent moving bed, so that the waste gas alternately crosses and crisscrosses each moving bed successively from the lowest to the highest moving bed, said moving beds being arranged vertically and in series, wherein n is an integer of at least 2, said waste gas being passed through a first moving bed, mixed with ammonia outside the bed and then fed to a second moving bed, said process being repeated successively through the series of n moving beds until the waste gas exits from the n-th moving bed, while the carbonaceous material is transported from the n-th to the first moving bed.

2. The method of removing sulfur oxides and nitrogen oxides as claimed in claim 1, wherein ammonia is further added to the waste gas before entering the first moving bed.

3. The method of removing sulfur and nitrogen oxides as claimed in claim 1, wherein the ammonia is added in the form of ammonia gas alone or diluted with another gas.

4. The method of removing sulfur and nitrogen oxides as claimed in claim 1, wherein the moving bed is held at a temperature of from room temperature to 180° C.

5. The method of removing sulfur and nitrogen oxides as claimed in claim 1, wherein the carbonaceous adsorbent least one member selected from the group consisting of activated carbons, activated cokes, and semi-cokes.

6. The method of removing sulfur and nitrogen oxides as claimed in claim 1, wherein the ammonia is added to the waste gas leaving the first moving bed in an $NH_3/(SO_2+NO_x)$ mol ratio of 0.1 to 1.4.

7. The method of removing sulfur and nitrogen oxides as claimed in claim 1, wherein the carbonaceous adsorbent leaving the n-th moving bed is regenerated and circulated to the first moving bed.

8. The method of removing sulfur and nitrogen oxides as claimed in claim 7, wherein the regeneration is carried out by heating.

9. The method of removing sulfur and nitrogen oxides as claimed in claim 1, wherein the waste gas leaving the n-th moving bed is treated by the carbonaceous adsorbent used mainly for removal of sulfur oxides to remove unreacted ammonia.

10. In a dry method of removing sulfur and nitrogen oxides by a dry process comprising passing a waste gas containing sulfur and nitrogen oxides through a moving bed or beds formed of a carbonaceous adsorbent in a direction transverse thereto to remove the sulfur oxides and adding ammonia to remove the nitrogen oxides, the improvement which comprises passing the waste gas containing sulfur and nitrogen oxides through n number of moving beds each formed of carbonaceous materials moving downward in a piston flow in such a manner that the waste gas is allowed to flow upward, said waste gas being directed through each of the moving beds in a transverse direction and in an opposite direction to the movement of the waste gas in the next adjacent moving bed so that the waste gas alternately crosses the crisscrosses each moving bed successively, from the lowest to the highest moving bed, said moving beds being arranged vertically and in series, wherein n is an integer of at least 2, said waste gas being passed through a first moving bed and then fed to a second moving bed, while ammonia is added directly to each of the moving beds, said process being repeated successively through the series of n moving beds until the waste gas exits from the n-th moving bed, while the carbonaceous material is transported from the n-th to the first moving bed.

11. The method of removing sulfur oxides and nitrogen oxides as claimed in claim 1, wherein ammonia is further added to the waste gas before entering the first moving bed.

12. The method of removing sulfur and nitrogen oxides as claimed in claim 1, wherein the ammonia is added in the form of ammonia gas alone or diluted with another gas.

13. The method of removing sulfur and nitrogen oxides as claimed in claim 1, wherein the moving bed is held at a temperature of from room temperature to 180° C.

14. The method of removing sulfur and nitrogen oxides as claimed in claim 1, wherein the carbonaceous adsorbent least one member selected from the group consisting of activated carbons, activated cokes and semi-cokes.

* * * * *